United States Patent [19]
Campbell et al.

[11] Patent Number: 5,813,042
[45] Date of Patent: Sep. 22, 1998

[54] METHODS AND SYSTEMS FOR CONTROL OF MEMORY

[75] Inventors: Scott Allan Campbell, Cary; Lynn Douglas Long, Chapel Hill; Linwood Hugh Overby, Jr.; Bala Rajaraman, both of Raleigh, all of N.C.

[73] Assignee: International Business Machines Corp., Armonk, N.Y.

[21] Appl. No.: 802,599

[22] Filed: Feb. 19, 1997

[51] Int. Cl.$^6$ .................................................. G06F 13/00
[52] U.S. Cl. ........................................... 711/159; 711/170
[58] Field of Search .................................. 711/100, 133, 711/134, 136, 154, 159, 160, 170, 173

[56] References Cited

U.S. PATENT DOCUMENTS

| | | | |
|---|---|---|---|
| 4,277,826 | 7/1981 | Collins et al. | 711/206 |
| 4,365,295 | 12/1982 | Katzman et al. | 711/206 |
| 4,586,134 | 4/1986 | Norstedt | 395/200.58 |
| 4,811,216 | 3/1989 | Bishop et al. | 711/153 |
| 4,926,322 | 5/1990 | Stimac et al. | 395/500 |
| 5,027,269 | 6/1991 | Grant et al. | 395/680 |
| 5,237,673 | 8/1993 | Orbits et al. | 711/170 |
| 5,269,013 | 12/1993 | Abramson et al. | 711/170 |
| 5,278,834 | 1/1994 | Mazzola | 370/469 |
| 5,297,265 | 3/1994 | Frank et al. | 711/202 |
| 5,386,536 | 1/1995 | Courts et al. | 711/136 |
| 5,396,614 | 3/1995 | Khalidi et al. | 711/118 |

*Primary Examiner*—Tod R. Swann
*Assistant Examiner*—Conley B. King, Jr.
*Attorney, Agent, or Firm*—Jerry W. Herndon

[57] ABSTRACT

Effective memory management maximizes the use of main memory in a computing system by avoiding the issuance of operating system primitives which result in overhead and increased processing time. This allows an applications program to change the state of a storage unit such as a buffer or page without requiring the issuance of an operating system primitive to change the physical state of the storage unit. A storage manager is provided for controlling the movement of data between storage units in secondary storage and storage units in main memory. A storage unit state indicator or flag is associated with each storage unit in main memory. In addition, a system state indicator for indicating the physical state of a storage unit is also associated with each storage unit. The system state indicator may be set to one of the states of fixed or pageable while the storage unit state indicator may be set to one of the states of fixed, pageable or don't care. The storage manager monitors the usage of memory to determine whether a fixed storage constraint may occur. Upon a determination that a fixed storage constraint may occur, the storage manager notifies the applications programs of the fixed storage constraint. In response, applications programs can temporarily change the state of a storage unit containing data which temporarily may not be needed by the applications program from fixed to don't care by changing the storage unit state indicator from fixed to don't care. Thus, the storage unit is available to the storage manager if needed without the need to have the storage manager issue an operating system primitive to change the system state indicator for the storage unit from fixed to pageable.

30 Claims, 4 Drawing Sheets

| STORAGE MANAGER | APPLICATION 1 | APPLICATION 2 | APPLICATION 3 |
|---|---|---|---|
| | 1) REQUEST POOL CREATE | | |
| 2) STRUCTURES CREATED TO REPRESENT POOL FOR APPL1 | | | |
| | 3) GET FIXED BUFFERS | | |
| | | 4) REQUEST POOL CREATE | |
| 5) APPL2 ADDED AS USER | | | |
| | | | 6) REQUEST POOL CREATE |
| 7) APPL3 ADDED AS USER | | | |
| | | 8) GET PAGEABLE BUFFER | |
| | | | 9) GET FIXED BUFFER |
| | 10) GET FIXED BUFFERS | | |
| 11) NOTIFICATION TO USER OF FIXED STORAGE CONSTRAINT | | | |
| | | 12) ATTEMPT TO FIX OBTAINED BUFFER, REQUEST SUSPENDED DUE TO FIXED CONSTRAINT | |
| | | | 13) ATTEMPT TO GET ANOTHER FIXED BUFFER, REQUEST SUSPENDED DUE TO FIXED CONSTRAINT |
| | 14) CHANGE BUFFERS NOT REQUIRED AS FIXED TO DON'T CARE BASED ON STORAGE MANAGER NOTIFICATION | | |
| 15) STORAGE MANAGER FREED ENOUGH (BUT NOT ALL) STORAGE (RECLAIMATION ROUTINE COMPLETED) TO OVERCOME FIXED STORAGE CONSTRAINT | | | |
| | | 16) SUSPENDED REQUEST FOR FIX SATISFIED | |
| | | | 17) SUSPENDED REQUEST FOR FIXED BUFFER SATISFIED |

FIG. 6.

METHODS AND SYSTEMS FOR CONTROL OF MEMORY

FIELD OF THE INVENTION

This invention relates to memory management for communications systems, and more particularly to memory management for computing systems, including communications systems, which process large quantities of data.

BACKGROUND OF THE INVENTION

Memory management has long been a primary concern of computing systems, including communications systems (collectively "computing systems"). Memory management becomes even more critical as the amount of data and program instructions to be processed increases. Memory may be divided in a number of different ways. For purposes of the present invention, memory may be viewed generally as being divided into two categories, namely, secondary storage which also may be referred to as permanent storage, and main memory which may be referred to as working memory or real storage. Secondary storage is high volume, low speed storage which may require input/output ("I/O") operations for accessing the storage. An example of secondary storage is DASD (i.e., direct access storage device). Main memory is generally significantly smaller in size than the secondary storage. As a result, an entire applications program or other large blocks of data often may not fit entirely into main memory. Moreover, in an environment where several applications programs are being executed concurrently, all of the applications programs and data to be used by the applications programs generally will not fit into main memory at the same time. Thus, main memory generally must be shared among multiple applications programs.

During execution, an applications program addresses specific storage locations in secondary storage. In order to increase the speed of processing and consequently decrease processing time, the data stored in secondary storage to be used by an executing applications program is loaded from secondary storage into main memory. However, due to the constraint on the size of main memory, as well as the number of different applications programs being processed concurrently, it may not be possible to load either the entire applications program or the entire set of data being used by the applications program into main memory. As such, the operating system must manage the sharing of main memory among multiple applications programs. Consequently, applications programs which require a large number of I/O operations may cause a bottleneck in a computing system.

Thus, effectively managing the sharing of main memory is important. The importance of such memory management becomes more critical as the amount of data to be processed by applications programs increases.

A number of methods are known for managing the sharing of main memory. One such method is referred to as "paging." In the past, paging has been an effective method for managing memory by removing the need for the entire applications program or set of data to be in main memory. Paging is a technique in which main memory address spaces are split into fixed length blocks which may be referred to as pages. Secondary storage is also preferably divided into pages of the same size as those in main memory. Since the pages of a program or data in secondary storage and the pages in main memory are equal size, the pieces of a program or data may be easily fitted into main memory.

While processing, if it is determined that a particular piece of the program or data is not in main memory, then the page having the requested piece of the applications program or data stored therein is loaded from secondary storage into main memory. As a result, paging systems generally have a "fetch policy" and a strategy for "page replacement." A fetch policy refers to the method for choosing a page from secondary storage to be moved into main memory while the page replacement strategy refers to the method of choosing a page presently in main memory to be replaced or overlaid when another page is ready to be loaded into main memory from secondary storage. An exemplary fetch policy is "pre-paging" which retrieves pages from secondary storage and loads them into main memory based on anticipation that a program will need the pages in the near future. An exemplary page replacement strategy is "least recently used" (i.e., LRU) which discards the page which has not been referenced for the longest period of time.

The administration of a paging system and method is often handled by the operating system storage manager. It is not uncommon for an operating system storage manager to set a flag or indicator associated with each page of data or of an applications program in main memory to indicate whether the physical state (i.e., the state of the page from the operating system's perspective) of the page is "fixed" or "pageable." A page which is "fixed" refers to a page that is not available to be replaced using any page replacement strategy as long as the page remains "fixed." In contrast, a page which is "pageable" refers to a page that is available to be replaced using a page replacement strategy.

A system state flag indicating whether the physical state of a page is fixed or pageable can be changed by the operating system storage manager. Thus, as part of the memory sharing process, when it is necessary to replace a page in main memory, only those pages whose system state flag was set to the state of pageable by the operating system storage manager can be replaced. Those pages whose system state flag was set to fixed by the operating system storage manager generally cannot be replaced as long as the physical state remains as fixed.

Memory management systems, including various paging systems, are described in detail in Chapters 4 and 5 of the textbook entitled "Operating Systems" by Tsichritzis and Berstein, Academic Press, Inc. (1974); Chapter 12 of the textbook entitled "Computer System Architecture" by Mano, Prentice Hall, Inc. (2nd Edition, 1982); and Chapter 8 of the textbook entitled "Computer Programming and Architecture: The VAX-11" by Levy and Eckhouse, Digital Press (1980), all of which are incorporated herein by reference.

The user or applications program can cause the system state indicator for a page to be changed by the operating system storage manager. This generally can only be accomplished by notifying the operating system that the physical state for a particular page in main memory as indicated by the system state flag is to be changed from fixed to pageable or pageable to fixed. Thus, in order to change the state of the system state flag for a page, the operating system must be notified and the change must be made at the operating system level.

The method for managing the sharing of memory referred to as "paging" is directed to managing the sharing of memory management at the operating system level. At this level of operating the operating system storage manager which controls the "paging" of individual pages in main memory has no knowledge whether a particular page that is being managed contains a portion of an applications program or a block or other data to be processed by an applications program.

Another method for managing the sharing of memory which is similar to "paging" involves the management of buffers which may contain one or more pages of data to be processed by an applications program. This method, which may be referred to as "buffer management," utilizes a buffer storage manager which operates in a manner similar to the operating system storage manager. Unlike the operating system storage manager, the buffer storage manager interacts directly with an applications program. The applications program can instruct the buffer storage manager on the movement of buffers of data between secondary storage and main memory.

In summary, paging and buffer management are schemes of memory management used to increase the conservation of critical system resources including the management of main memory. Memory management through the use of either a paging or buffer management method and system permits the effective management, compaction and relocation of odd size segments since applications programs and sets of data are divided into equal size blocks. However, this management is affected by issuing operating system primitives at the operating system level to fix or free pages or buffers in main memory. The issuance of operating system primitives results in additional overhead, and thus negatively impacts performance. Accordingly, there is a continued need to improve the performance and effectiveness of managing main memory which is a critical system resource.

SUMMARY OF THE INVENTION

It is, therefore, an object of the present invention to provide methods, systems and computer programs for improving the management of memory in a computing system for more effectively managing critical system resources in a computing system.

It is another object of the present invention to provide methods, systems and computer programs for effectively paging memory and managing buffers in memory in a computing system to efficiently use main memory.

These and other objects are provided according to the present invention by a memory management system for maximizing the effective use of main memory in a computing system. The present invention is applicable to the management of sharing of different units of storage by different storage managers, including pages which are managed by the operating system storage manager and buffers which are managed by the buffer storage manager. The different units of storage, including, without limitation, pages and buffers, are hereinafter collectively referred to as "storage units."

The present invention stems from the realization that heretofore, when a user does not need a storage unit to be fixed in main memory for the near future time in processing and thus the user wants to change the state of the storage unit from fixed to pageable and subsequently back to fixed later on, the operating system storage manager must be notified of the change, and an operating system primitive must be issued to change the physical state of each page of the buffer in main memory from fixed to pageable in response to the user's request. The issuing of the operating system primitive results in additional overhead and processing time since the operating system storage manager must make a change to the physical state of each page of the buffer.

Thus, memory management systems according to the present invention provide systems, methods and computer programs to allow the user or applications program to temporarily change the state of a storage unit without requiring the operating system to issue an operating system primitive to change the physical state of the buffer, thereby avoiding the overhead associated with the operating system primitive that changes the storage unit's physical state. Memory management systems, methods and computer programs according to the present invention provide a storage manager for controlling the movement of data between the storage units in main memory and the secondary storage. The secondary storage which is used for storing data, including applications programs, includes a plurality of storage locations. The main memory, which is used for storing data, including applications programs, also includes a plurality of storage units of memory.

Movement of data, including portions of applications programs, between storage locations in secondary storage and the storage units in main memory is controlled by the storage manager based upon storage unit state indicators which are associated with the storage units. One storage unit state indicator is associated with each storage unit, and may be set to one of the states of fixed, pageable or don't care by the user or applications program. If the storage unit state indicator is set to fixed by the user or applications program, the data in the storage unit is fixed and cannot be replaced by another storage unit from secondary storage. If the storage unit state indicator is set to pageable by the user or applications program, the data stored in the storage unit is not fixed and may be replaced with data stored in secondary storage. Finally, if the storage unit state indicator for a storage unit is set to the state of don't care by the user or applications program, the data stored in the storage unit may be either fixed or pageable depending on the needs of the communications system.

The storage manager determines the level of usage of the secondary storage and the main memory, and the movement of data between the secondary storage and main memory, and controls the movement of data between the secondary storage and the storage units in main memory in response to the level of usage. Upon determining that the level of usage of main memory is high and that a large number of storage units are fixed in main memory, the storage manager notifies the applications program of the occurrence of a high level of usage and a possible system constraint (e.g., fixed storage constraint). In response, the applications program may change the storage unit state indicator for a storage unit associated with the applications program from one state to another. For example, if the applications program receives a signal from the storage manager of a possible fixed storage constraint due to the high level of usage, the user can temporarily change the state of the storage unit containing data that is still required for use by the applications program by changing the storage unit state indicator from fixed to don't care. As a result of the applications program having changed the storage unit state indicator from fixed to don't care, the storage manager has the storage unit available if needed without the need to have the operating system issue an operating system primitive to change the physical state (i.e., the system state indicator) for the storage unit from fixed to pageable. Thereafter, the applications program can change the storage unit state indicator for the storage unit back to fixed. Thus, the applications program can make the storage available for other storage units, without changing the physical state (i.e., the system state indicator) for the storage unit unless the storage manager actually requires that data stored in the storage unit in main memory be replaced by other data from secondary storage.

Only if the storage manager determines that a particular storage unit in main memory whose storage unit state indicator is set to don't care is needed, will the storage manager notify the operating system to change the physical state of the storage unit from fixed to pageable. The storage unit state indicator remains at don't care until the applications program changes the storage unit state indicator to pageable or back to fixed, without incurring any overhead due to the issuance of an operating system primitive. Thus, the present invention avoids the overhead resulting from the issuance of an operating system primitive to change the physical state of a storage unit from fixed to pageable unless the storage manager actually needs the storage unit to store other data therein. As a result, unnecessary overhead is avoided thereby improving the performance and effectiveness of a computing system's use of main memory.

BRIEF DESCRIPTION OF THE DRAWINGS

FIG. 6 is a control flow table illustrating the cooperative operations of the memory management system in processing an example having three applications programs.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
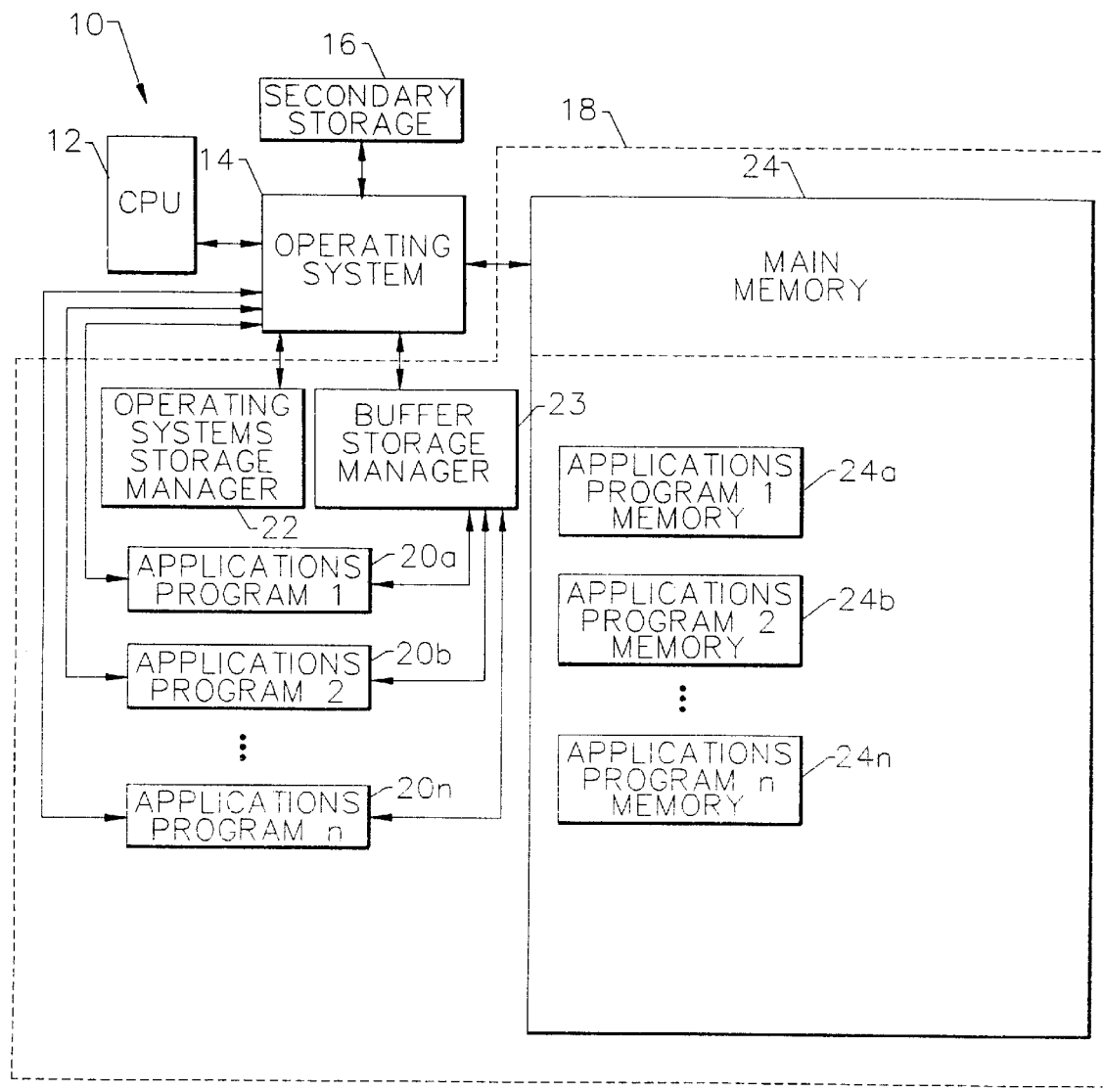
FIG. 1 is a schematic block diagram illustrating a computing system including a memory management system.

Referring now to FIG. 1, a computing system having a memory management system for sharing memory will now be described. As shown in FIG. 1, computing system 10 includes a central processing unit ("CPU") 12 which communicates directly with an operating system 14. Operating system 14 communicates directly with secondary storage 16, and memory management system 18. Memory management system 18 includes a number of applications programs 20a, 20b . . . 20n. These programs represent user applications operating on central processing unit 12 via operating system 14. Memory management system 18 also includes operating system storage manager 22, buffer storage manager 23, and main memory 24. Main memory includes memory 24a, 24b . . . 24n for the applications programs. Secondary storage, which is typically larger than main memory, may also be referred to as permanent storage or real storage. DASD is an example of a type of secondary storage. Main memory, which typically is significantly smaller in size than secondary storage, may also be referred to as working memory.

In operation, data and applications programs are permanently stored in secondary storage 16. As data and portions of applications programs (e.g., module or routine) are needed by an applications program, operating system 14 retrieves the data or portions of an applications program from secondary storage 16 and loads the data or portions of the applications program into main memory 24. In order to more efficiently use main memory which is relatively small in size compared to secondary storage 16, and also to avoid the need for the operating system to retrieve data and program instructions from secondary storage 16, a system for managing data was previously developed. This system, which may be referred to as a paging system, stores the data and portions of the applications program in secondary storage 16 in "pages," which are logical units of storage. In addition, main memory 24 may also be divided into pages such that the pages in main memory 24 are the same size as the pages in secondary storage 16. Therefore, pages of data and portions of the program retrieved from secondary storage 16 can be loaded easily into main memory 24 without fragmenting portions of main memory. Fragmentation of main memory is undesirable in that it leaves smaller portions of memory unoccupied when logical units of data and portions of the applications program of varying sizes are loaded in the main memory.

Figure 2:
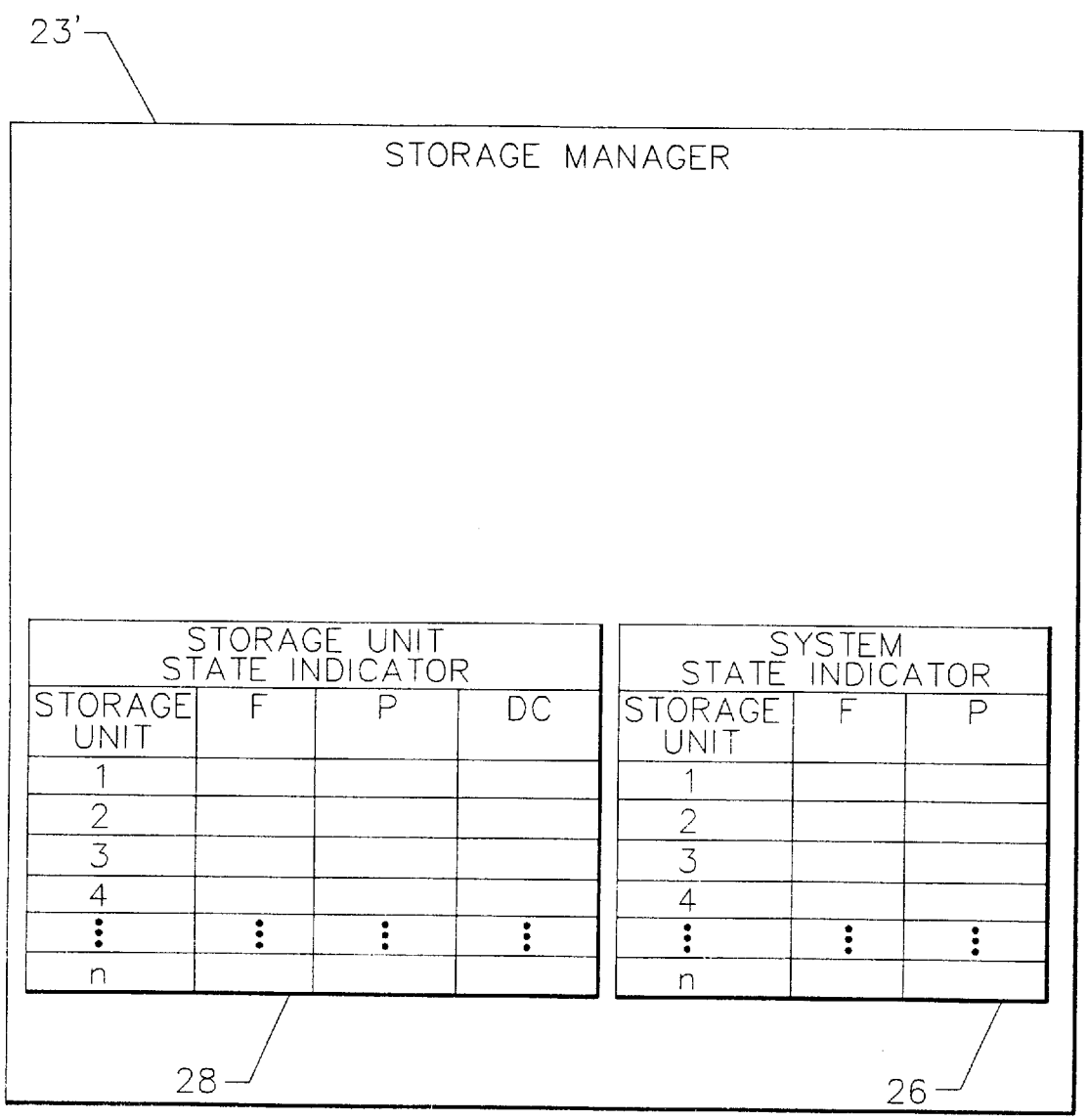
FIG. 2 is a detailed block diagram of the storage manager and the storage unit state indicators and system state indicators of the memory management system of FIG. 1 according to the present invention.

As illustrated in FIG. 2, storage manager 23' according to the present invention maintains a page table 26 which contains a list of those pages or buffers (i.e., storage units) that together compose the set of data and portions of applications program pages to be used by a particular applications program. This table contains a list of physical states (i.e., system state indicators) from the operating system perspective indicating that a storage unit in main memory is either fixed or pageable. If the storage unit is fixed in main memory, the contents of the storage unit will not be replaced by operating system 14 until the physical state of the storage unit is changed from fixed to pageable. On the other hand, if the physical state of the storage unit is pageable, operating system 14 will replace the contents of the storage unit in main memory 24 with the contents of another storage unit from secondary storage 16. The physical state of each storage unit from the operating system perspective may be maintained by storage manager 23' in a table of system state indicators 26 for each applications program.

In order to change the system state indicator from the operating system perspective (i.e., change the physical state of a storage unit) from fixed to pageable or pageable to fixed, an operating system primitive must be issued. As a result, the entry for the storage unit in main memory will be changed in the system state indicator table 26 of storage manager 23' by the operating system in response to a request to change the state of the particular storage unit by an applications program. A critical constraint in the form of a fixed storage constraint can occur when a large number of storage units in main memory 24 have a fixed state and cannot be replaced or discarded by the operating system 14 while at the same time various applications programs need data which is presently stored in secondary storage 16 which needs to be loaded into main memory 24 in order to be processed. As a result, a critical condition can occur.

According to the present invention, a set of storage unit state indicators 28 is also maintained by the storage manager 23'. The storage unit state indicators are associated with storage units in main memory from the applications program's perspective. The storage unit state indicators correspond in part to the system state indicators. In particular, both the storage unit state indicators from the applications program's perspective and the system state indicators from the operating system's perspective include the states of fixed and pageable. When an applications program changes a storage unit state indicator from fixed to pageable or pageable to fixed, an operating system primitive must also be issued in order to make the same change to the system state indicators so that the state indicators from the applications program's perspective and from the operating system's perspective for a particular storage unit are the same.

However, in order to improve the management of main memory 24 and movement of data between secondary storage 16 and main memory 24, the present invention adds the capability of dynamically paging the main memory 24. This is accomplished by the addition of the third state of don't care from the perspective of the applications programs. The don't care state as illustrated in the table of storage unit state indicators 28 is maintained by storage manager 23'. If storage manager 23' determines that the level of usage of main memory is very high and is reaching a critical level and that many of the storage units in main memory have a fixed state, storage manager 23' notifies the applications programs of this potentially critical system resource constraint to allow the user of the storage unit to cooperatively participate with storage manager 23' in maximizing the effective use of critical system resources such as main memory 24. In response to the receipt of a notification from storage manager 23' of a potentially critical system resource constraint in the form of a fixed storage constraint, the applications program may change the storage unit state indicator for a storage unit associated with the applications program from one state to another. For example, the state of the storage unit containing data that is still required for use by the applications program at some point in the future may be changed temporarily by the applications program by changing the storage unit state indicator from fixed to don't care. By changing the storage unit state indicator from fixed to don't care, storage manager 23' has the storage unit available if needed without the need to have the operating system issue an operating system primitive to change the physical state (i.e., the systems state indicator) for the storage unit from fixed to pageable. Thereafter, the applications program can change the storage unit state indicator back from don't care to fixed.

Thus, the applications program can make the storage unit available for other data without changing the physical state of the storage unit from the operating system perspective unless storage manager 23' actually requires that the data stored in the storage unit in main memory 24 be replaced by other data from secondary storage. If storage manager 23' actually needs to use a storage unit whose storage unit state indicator is don't care, the storage manager will then, and only then, notify the operating system by issuing an operating system primitive to change the physical state for the storage unit from fixed to pageable, and to change the system state indicator for the particular buffer from fixed to pageable. The storage unit state indicator remains set at don't care until the applications program changes the storage unit state indicator for the particular storage unit back to fixed. As a result, no operating system primitive is issued to change the system state indicator from fixed to pageable, thereby avoiding any overhead that would be incurred due to the issuance of an operating system primitive, until such time as storage manager 23' determines that it actually needs to use the particular storage unit.

FIGS. 3–6 are flowchart and control flow illustrations of methods, apparatus (systems) and program products according to the invention. It will be understood that each block of the flowchart and control flow illustrations, and combinations of blocks and steps in the flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart or control flow block(s) and step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart or control flow block(s) or step(s).

Accordingly, blocks and steps of the flowchart and control flow illustrations support combinations of means for performing the specified functions, combinations of steps for performing the specified functions and program instruction means for performing the specified functions. It will also be understood that each block or step of the flowchart and control flow illustrations, and combinations of blocks and steps in the flowchart and control flow illustrations, can be implemented by special purpose hardware-based computer systems which perform the specified functions or steps, or combinations of special purpose hardware and computer instructions.

Figure 3:
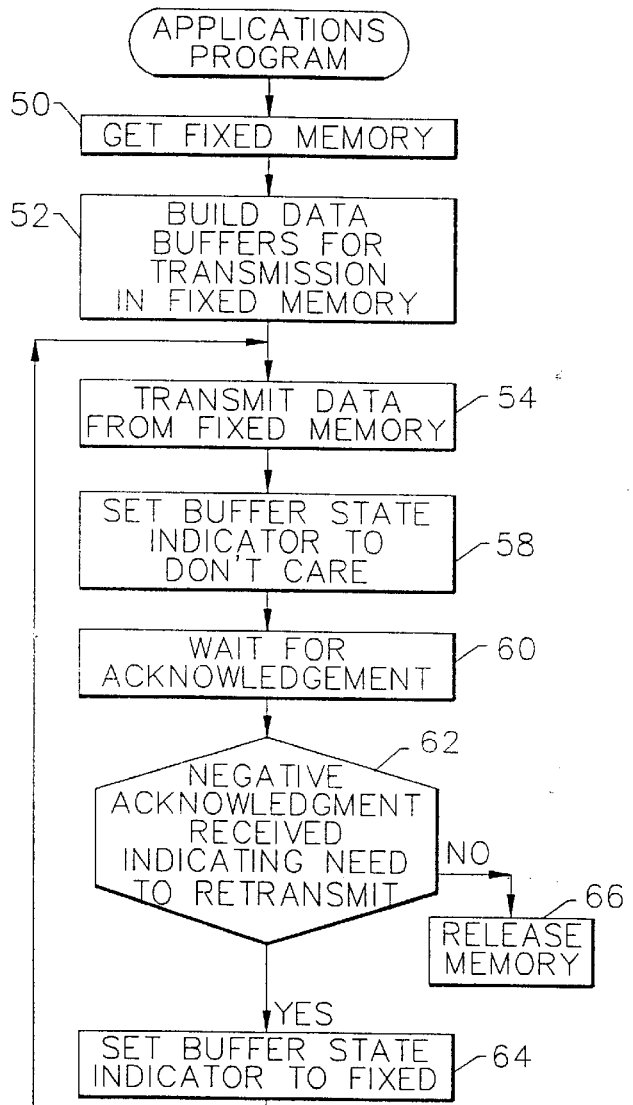
FIG. 3 is a flowchart representation illustrating the operation of an applications program changing the setting of a storage unit state indicator from fixed to don't care.

Referring to FIG. 3, a high level flowchart illustrating an example of how the applications program may set a storage unit state indicator to don't care will be described. This example is in the context of transmission of data from an applications program processing on a first node to an applications program processing on a second node in a communications system. In this particular example, and the examples described with respect to FIGS. 4–6, the storage units are "buffers," and the storage unit state indicators are buffer state indicators. The decision as to whether to change a storage unit state indicator from fixed to don't care upon the receipt of a notice from storage manager 23' that a fixed storage constraint exists is solely at the discretion of the applications program. In this example, the applications program makes a request to get a fixed storage unit in main memory at 50. This request may be made when an applications program needs a fixed buffer to process the next step in the applications program such as sending data to another node on a network. Data is then built into buffers that are fixed in main memory for transmission at 52. The data is then transmitted from fixed memory to another node on the network at 54. The applications program causes the storage manager 23' to change the buffer state indicator for the buffer from fixed to don't care at 58. The applications program then waits at 60 for an acknowledgement from the receiving node that the transmitted data was received correctly by the receiving node.

Upon receipt of an acknowledgement by the transmitting node from the receiving node, a determination is made at 62 as to whether the acknowledgement is "negative" or "positive." If the acknowledgement from the receiving node is "negative" meaning that an error occurred in the transmission of the data, the applications program causes the storage manager 23' to change the buffer state indicator for the particular buffer to fixed at 64 and control is returned to 54 for retransmission of the data. If the acknowledgement received by the applications program from the receiving node is "positive" meaning that the data transmitted by the applications program was received correctly and accurately by the receiving node, the storage manager 23' releases the buffer at 66 and returns the buffer to the pool of available buffers.

Figure 4:
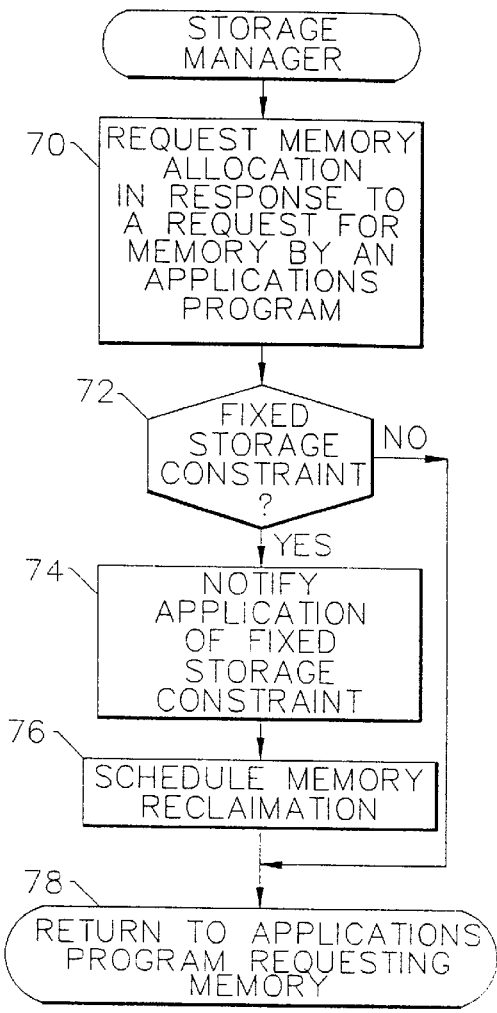
FIG. 4 is a flowchart representation illustrating operation of the storage manager upon a request for fixed memory by an applications program.

Referring now to FIG. 4, a high level flowchart illustrating the operation of the storage manager 23' upon a request for fixed memory will now be described. The storage manager requests memory allocations from main memory at 70 in response to a request for memory by an applications program. The storage manager 23' then determines at 72 whether a fixed storage constraint may exist (i.e., whether there is a possible constraint on the system in that too many pages have been set to the fixed state and thus not enough pages can be replaced or discarded from main memory). The existence of a fixed storage constraint may be identified by the storage manager 23' by comparing the system state indicators and the buffer state indicators, the limits on main memory and how much main memory is in use, and a predetermined threshold for a fixed storage constraint. The comparison performed by the storage manager 23' may use any method for determining whether a threshold has been met.

Based upon a determination by the storage manager at 72 that a fixed storage constraint exists, the storage manager 23' notifies the applications program at 74 of the occurrence of a fixed storage constraint The storage manager 23' then schedules memory reclamation at 76, and returns control and a buffer to the requesting applications program at 78. If a determination is made at 72 that no fixed storage constraint exists, a buffer and control is returned to the applications program requesting the storage.

Figure 5:
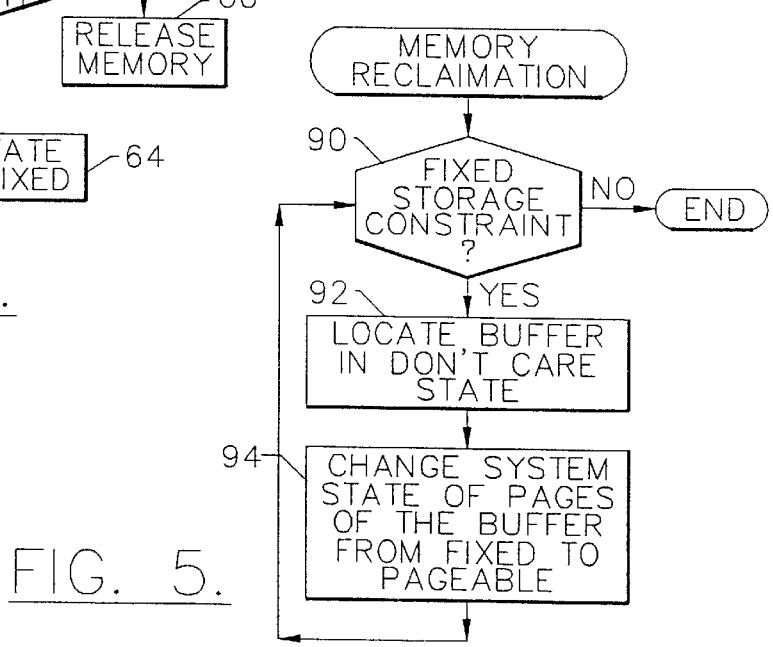
FIG. 5 is a flowchart representation illustrating operation of storage manager during memory reclamation.

Referring now to FIG. 5, a high level flowchart illustrating operation of the storage manager 23' during memory reclamation is shown. During memory reclamation processing, storage manager 23' makes a determination at 90 as to whether a fixed storage constraint exists in accordance with the process described above or any other method used to compare memory usage against a threshold level. If a fixed storage constraint exists, the storage manager 23' then locates a buffer having a don't care state at 92. Thereafter, the storage manager 23' notifies the operating system to change the system state indicator for the pages of the buffer from fixed to pageable at 94. The storage manager 23' then repeats this process to determine if a fixed storage constraint still exists at 90, and the process of locating buffers in the don't care state and causing the operating system to change the system state indicators for the pages of the located buffers from fixed to pageable is repeated. If a determination is made at 90 that a fixed storage constraint no longer exists, then the storage manager simply terminates the memory reclamation process.

Referring now to FIG. 6, a control flow diagram of the cooperative participation among three applications programs in handling a system resource constraint is illustrated. In step 1, applications program number 1 ("Appl 1") requests that a pool of memory in the form of multiple blocks or pages of memory be created by the storage manager 23'. At step 2, the storage manager, in response to step 1, creates a pool of memory of fixed and pageable buffers for Appl 1. Appl 1 then determines that a fixed buffer is needed, and requests a number of fixed buffers in main memory at step 3. The storage manager 23' (not shown) will then identify a buffer that is fixed based on the systems state indicator for a buffer and provides this buffer for use by the Appl 1.

Next in this example at step 4, applications program number 2 ("Appl 2") also requests that a pool of memory be created. In response to Appl 2's request for the creation of a pool, the storage manager 23', rather than creating a second pool, simply adds Appl 2 as a user at step 5 to the pool previously created. Thereafter, applications program number 3 ("Appl 3") requests that a pool of memory be created at step 6. In response, the storage manager 23', rather than creating another pool of memory, also adds Appl 3 as a user to the already created pool at step 7.

In the example illustrated in FIG. 6, Appl 2 then requests at step 8 a pageable buffer by notifying the storage manager 23' to set the buffer state indicator for a buffer as pageable, and in turn, the storage manager 23' (not shown) notifies the operating system to set the system state indicator for the pages of the selected buffer to pageable.

Appl 3 then requests a fixed buffer at step 9. As a result, the storage manager 23' (not shown) sets the buffer state indicator for a particular buffer to fixed, and notifies the operating system to set the system state indicator for the pages in the same buffer to a fixed state. Thereafter, in this example, Appl 1 requests a fixed buffer at step 10, and the storage manager 23' (not shown) sets the buffer state indicator for the selected buffer to fixed, and notifies the operating system to set the system state indicator for the pages in the same buffer to fixed.

As a result of these cumulative requests for buffers, the storage manager 23' determines that a fixed storage constraint has occurred and notifies all three applications programs of the fixed storage constraint at step 11. Appl 2 then attempts at step 12 to fix the buffer which was obtained as pageable, and this attempt is suspended due to the fixed storage constraint. Appl 3 then attempts at step 13 to get another fixed buffer. This attempt also is suspended in step 13 due to the fixed storage constraint.

Thereafter, and in response to the notification from the storage manager 23' of a fixed storage constraint, Appl 1 at step 14 identifies buffers which it temporarily does not need to be fixed, and instructs the storage manager 23' to change the buffer state indicators for the identified buffers from fixed to don't care. Thereafter, the storage manager 23' at step 15 issues a page free command and notifies the operating system to change the system state indicator from fixed to pageable for each buffer having a buffer state indicator set to don't care until a sufficient number of pages have been "freed" (i.e., physical state changed to pageable) to accommodate the requests for fixed memory by Appl 2 and Appl 3. Operating system primitives will not be issued for every buffer's pages whose buffer state indicator is set to don't care. Rather, the storage manager 23' will only continue to notify the operating system to change the physical state of pages of buffers from fixed to pageable for those buffers whose buffer state indicators have been set to don't care by the applications program until the fixed storage constraint has been overcome. Thus, a number of buffers whose buffer state indicator has been set to don't care may not have their corresponding system state indicator changed from fixed to pageable, thereby avoiding the unnecessary overhead of issuing operating system primitives for buffers' pages not presently needed by the storage manager 23'.

Finally, as a result of the change of the buffer state indicators from fixed to don't care by Appl 1, and the issuing of the minimum number of operating system primitives necessary to overcome the fixed storage constraint, the requests by Appl 2 and Appl 3 for fixed buffers which had been suspended are processed at steps 16 and 17, and the fixed buffer requests are satisfied.

In general, if the applications program changes the state of a buffer from the applications program's perspective (i.e., changes the buffer's indicator state) from fixed to don't care, then the operating system will change the system state indicator from the operating system perspective for the particular buffer from fixed to pageable in the event that the storage manager 23' determines that the buffer is needed to process data. As a result of the present invention, the don't care state enables the applications program to temporarily change the usage of buffers or pages to prevent the crippling of the system. In the present invention, the user may change the buffer state indicator from fixed to don't care to temporarily change the state of a buffer containing data that is still required by the applications program. The don't care state enables the storage manager 23' to use the buffer or page if necessary. However, when the user again requires the buffer or page to be in a fixed state, the applications program can change the state of the buffer back from don't care to fixed. This provides the advantage that the user can make the main memory available for use by other applications programs if necessary without the need for an operating system primitive to be issued that changes the buffer's pages' physical state (the system state indicator for the pages of the buffer) unless the storage manager determines that it actually requires the buffer for use by another applications program or for storage of data to be loaded into the buffer from secondary storage.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim:

1. A memory management system for conserving storage in a computing system, said memory management system comprising:

storage means for storing data being used by application programs in said computing system, said storage means including a plurality of storage locations for storing data therein;

memory means for storing data being used by applications programs in said computing system, said memory means including a plurality of storage units for storing data therein;

a plurality of storage unit state indicators, each of said storage unit state indicators associated with one of said storage units for indicating that said corresponding storage unit is set to one of the states of fixed indicating that the data stored in the storage unit is fixed, pageable indicating that the data stored in the storage unit is not fixed and may be replaced with data stored in one of said stored locations, or don't care indicating that the data stored in the storage unit may be fixed or pageable; and storage manager means, operationally connected to said storage means, said storage units and responsive to said storage unit state indicators, for controlling the movement of data between said one of said plurality of storage units and said storage means in response to the one of said storage unit state indicators corresponding to the one of said storage units.

2. The memory management system according to claim 1 wherein said storage manager means comprises:

fixed controlling means for determining that said one of said storage unit state indicators corresponding to said one of said storage units was set to the state of fixed and for preventing the replacement of the data stored in said one of said storage units in response to said one of said storage unit state indicators having been set to the state of fixed;

pageable controlling means for determining that said one of said storage unit state indicators corresponding to said one of said storage units was set to the state of pageable and for replacing the data stored in said one of said storage units with said data stored in said storage means in response to said one of said storage unit state indicators having been set to the state of pageable; and don't care controlling means for determining that said one of said storage unit state indicators corresponding to said one of said storage units was set to the state of don't care, and for permitting the replacement of the data stored in said one of said storage units in response to said one of said storage unit state indicators having been set to the state of don't care.

3. The memory management system according to claim 1 wherein said storage manager means further comprises means for determining a level of usage of said storage means and means for controlling the movement of data between said one of said plurality of storage units and said storage means in response to the level of usage of said storage means.

4. The memory management system according to claim 3 further comprising:

a first applications program operationally connected to said one of said storage units, said storage unit state indicator corresponding to said one of said storage units, and said storage manager means; and wherein said storage manager means comprises means for notifying the first applications program that the level of usage of said storage means is high.

5. The memory management system according to claim 4 wherein said first applications program causes said storage manager means to change the setting of the one of said storage unit state indicators for the one of said storage units from the state of fixed to pageable in response to the storage manager means notification that the level of usage of the storage means is high.

6. The memory management system according to claim 4 wherein said first applications program causes said storage manager means to change the setting of the one of said storage unit state indicators for the one of said storage units from the state of fixed to don't care in response to the storage manager means notification that the level of usage of the storage means is high.

7. The memory management system according to claim 1 further comprising:

an operating system, operationally connected to said storage means, said memory means and said storage manager means, comprising means for determining said level of usage of said memory means, a plurality of system state indicators, each of said system state indicators being associated with one of said storage units for indicating that the buffer corresponding to one of said system state indicators is set by the operating system to one of the states of fixed or pageable, and means for controlling the movement of data between the storage means and the storage unit in response to the state of the system state indicators; and wherein said storage manager means further comprises:

means for comparing the storage unit state indicator for a storage unit with the system state indicator for the storage unit to determine that the storage unit state indicator was changed from fixed to pageable;

means for notifying said operating system to change the system state indicator from the state of fixed to pageable; and means for releasing the storage unit corresponding to the storage unit state indicator.

8. The memory management system according to claim 3 wherein said storage manager means further comprises means for determining a level of usage of said storage means and means for controlling the movement of data between said one of said plurality of storage units and said storage means in response to the level of usage of said storage means.

9. The memory management system according to claim 8 further comprising:

a first applications program operationally connected to said one of said storage units, said storage unit state indicator corresponding to said one of said storage units, and said storage manager means; and wherein said storage manager means comprises means for notifying the first applications program that the level of usage of said storage means is high.

10. The memory management system according to claim 9 wherein said first applications program causes said storage manager means to change the setting of the one of said storage unit state indicators for the one of said storage units from the state of fixed to don't care in response to the storage manager means notification that the level of usage of the storage means is high.

11. A memory management method for conserving storage in a computing system having a central processing unit, secondary storage having a plurality of storage locations for storing data therein, main memory having a plurality of storage units for storing data therein, and an operating system, said method comprising the steps of:

storing data being used by application programs in said computing system in said secondary storage;

storing data being used by applications programs in said computing system in said main memory;

associating one storage unit state indicator with one of said storage units and indicating that said corresponding storage unit is set to one of the states of fixed indicating that the data stored in the storage unit is fixed, pageable indicating that the data stored in the storage unit is not fixed and may be replaced with data stored in one of said stored locations, or don't care indicating that the data stored in the storage unit may be fixed or pageable; and controlling the movement of data between said one of said plurality of storage units in main memory and said secondary storage in response to the one of said storage unit state indicators corresponding to the one of said storage units.

12. The memory management method according to claim 11 wherein said controlling step comprises the steps of:

determining that said one of said storage unit state indicators corresponding to said one of said storage units was set to the state of fixed and preventing the replacement of the data stored in said one of said storage units in response to said one of said storage unit state indicators having been set to the state of fixed;

determining that said one of said storage unit state indicators corresponding to said one of said storage units was set to the state of pageable and replacing the data stored in said one of said storage units with said data stored in said secondary storage in response to said one of said storage unit state indicators having been set to the state of pageable; and determining that said one of said storage unit state indicators corresponding to said one of said storage units was set to the state of don't care, and permitting the replacement of the data stored in said one of said storage units in response to said one of said storage unit state indicators having been set to the state of don't care.

13. The memory management method according to claim 11 wherein said controlling step comprises the steps of:

determining a level of usage of said secondary storage; and controlling the movement of data between said one of said plurality of storage units and said secondary storage in response to the level of usage of said secondary storage.

14. The memory management method according to claim 13 further comprising the step of:

executing a first applications program on said central processing unit; and wherein said controlling step comprises the step of notifying the first applications program that the level of usage of said secondary storage is high.

15. The memory management method according to claim 14 wherein said executing step comprises the step of changing the setting of the one of said storage unit state indicators for the one of said storage units from the state of fixed to pageable in response to the notification that the level of usage of the storage means is high.

16. The memory management method according to claim 14 wherein said executing step comprises the step of changing the setting of the one of said storage unit state indicators for the one of said storage units from the state of fixed to don't care in response to the notification that the level of usage of the storage means is high.

17. The memory management method according to claim 11 further comprising the steps of:

determining said level of usage of said main memory means;

associating one system state indicator with one of said storage units and indicating that the storage unit corresponding to one of said system state indicators is set by the operating system to one of the states of fixed or pageable;

controlling the movement of data between the secondary storage and the storage unit in response to the state of the system state indicators; and wherein said controlling in response to one of said storage unit state indicators step further comprises the steps of:

comparing the storage unit state indicator for a buffer with the system state indicator for the storage unit to determine that the storage unit state indicator was changed from fixed to pageable;

notifying said operating system to change the system state indicator from the state of fixed to pageable; and releasing the storage unit corresponding to the storage unit state indicator.

18. The memory management method according to claim 13 wherein said controlling step further comprises the steps of: determining a level of usage of said secondary storage; and controlling the movement of data between said one of said plurality of storage units and said secondary storage in response to the level of usage of said secondary storage.

19. The memory management method according to claim 18 further comprising the step of:

executing a first applications program on said central processing unit; and wherein said controlling step comprises the step of notifying the first applications program that the level of usage of said storage means is high.

20. The memory management method according to claim 19 wherein said executing step comprises the step of changing the setting of the one of said storage unit state indicators for the one of said storage units from the state of fixed to don't care in response to the notification that the level of usage of the storage means is high.

21. A computer program product for conserving storage in a computing system having a central processing unit, secondary storage having a plurality of storage locations for storing data therein, main memory having a plurality of storage units for storing data therein, and an operating system, said computer program product comprising:

a computer readable storage medium having computer readable program code means embodied in said medium, said computer readable program code means comprising:

computer instruction means for storing data being used by application programs in said computing system in said secondary storage;

computer instruction means for storing data being used by applications programs in said computing system in said main memory;

computer instruction means for associating one storage unit state indicator with one of said storage units and indicating that said corresponding storage unit is set to one of the states of fixed indicating that the data stored in the storage unit is fixed, pageable indicating that the data stored in the storage unit is not fixed and may be replaced with data stored in one of said stored locations, or don't care indicating that the data stored in the storage unit may be fixed or pageable; and computer instruction means for controlling the movement of data between said one of said plurality of storage units in main memory and said secondary storage in response to the one of said storage unit state indicators corresponding to the one of said storage units.

22. The computer program product according to claim 21 wherein said computer instruction means for controlling comprises:

computer instruction means for determining that said one of said storage unit state indicators corresponding to said one of said storage units was set to the state of fixed and preventing the replacement of the data stored in said one of said storage units in response to said one of said storage unit state indicators having been set to the state of fixed;

computer instruction means for determining that said one of said storage unit state indicators corresponding to said one of said storage units was set to the state of pageable and replacing the data stored in said one of said storage units with said data stored in said secondary storage in response to said one of said storage unit state indicators having been set to the state of pageable; and computer instruction means for determining that said one of said storage unit state indicators corresponding to said one of said storage units was set to the state of don't care, and permitting the replacement of the data stored in said one of said storage units in response to said one of said storage unit state indicators having been set to the state of don't care.

23. The computer program product according to claim 21 wherein said computer instruction means for controlling comprises: computer instruction means for determining a level of usage of said secondary storage; and computer instruction means for controlling the movement of data between said one of said plurality of storage units and said secondary storage in response to the level of usage of said secondary storage.

24. The computer program product according to claim 23 further comprising:

computer instruction means for executing a first applications program on said central processing unit; and wherein said computer instruction means for controlling further comprises computer instruction means for notifying the first applications program that the level of usage of said secondary storage is high.

25. The computer program product according to claim 24 wherein said computer instruction means for executing comprises computer instruction means for changing the setting of the one of said storage unit state indicators for the one of said storage units from the state of fixed to pageable in response to the notification that the level of usage of the storage means is high.

26. The computer program product according to claim 24 wherein said computer instruction means for executing comprises computer instruction means for changing the setting of the one of said storage unit state indicators for the one of said storage units from the state of fixed to don't care in response to the notification that the level of usage of the storage means is high.

27. The computer program product according to claim 21 further comprising:

computer instruction means for determining said level of usage of said main memory means;

computer instruction means for associating one system state indicator with one of said storage units and indicating that the storage unit corresponding to one of said system state indicators is set by the operating system to one of the states of fixed or pageable;

computer instruction means for controlling the movement of data between the secondary storage and the storage unit in response to the state of the system state indicators; and wherein said computer instruction means for controlling in response to one of said storage unit state indicators further comprises:

computer instruction means for comparing the storage unit state indicator for a storage unit with the system state indicator for the storage unit to determine that the storage unit state indicator was changed from fixed to pageable;

computer instruction means for notifying said operating system to change the system state indicator from the state of fixed to pageable; and computer instruction means for releasing the storage unit corresponding to the storage unit state indicator.

28. The computer program product according to claim 23 wherein said computer instruction means for controlling further comprises: computer instruction means for determining a level of usage of said secondary storage; and computer instruction means for controlling the movement of data between said one of said plurality of storage units and said secondary storage in response to the level of usage of said secondary storage.

29. The computer program product according to claim 28 further comprising:

computer instruction means for executing a first applications program on said central processing unit; and wherein said computer instruction means for controlling comprises computer instruction means for notifying the first applications program that the level of usage of said storage means is high.

30. The computer program product according to claim 29 wherein said computer instruction means for executing comprises computer instruction means for changing the setting of the one of said storage unit state indicators for the one of said storage units from the state of fixed to don't care in response to the notification that the level of usage of the storage means is high.

* * * * *